United States Patent
Vankelecom et al.

(10) Patent No.: US 9,808,768 B2
(45) Date of Patent: Nov. 7, 2017

(54) METHOD FOR SYNTHESIS OF THIN FILM COMPOSITE MEMBRANES

(71) Applicant: Katholieke Universiteit Leuven, Leuven (BE)

(72) Inventors: Ivo Vankelecom, Oud-Heverlee (BE); Ellen Dom, Onze-Lieve-Vrouw-Waver (BE); Guy Koeckelberghs, Korbeek-Dijle (BE); Sanne Hermans, Maasmechelen (BE)

(73) Assignee: Katholieke Universiteit Leuven, Leuven (BE)

( * ) Notice: Subject to any disclaimer, the term of this patent is extended or adjusted under 35 U.S.C. 154(b) by 0 days.

(21) Appl. No.: 14/430,697

(22) PCT Filed: Sep. 24, 2013

(86) PCT No.: PCT/BE2013/000047
§ 371 (c)(1),
(2) Date: Mar. 24, 2015

(87) PCT Pub. No.: WO2014/043767
PCT Pub. Date: Mar. 27, 2014

(65) Prior Publication Data
US 2015/0231572 A1    Aug. 20, 2015

(30) Foreign Application Priority Data
Sep. 24, 2012 (GB) .................................. 1216964.5

(51) Int. Cl.
*B01D 67/00* (2006.01)

(52) U.S. Cl.
CPC ..... *B01D 67/0013* (2013.01); *B01D 67/0093* (2013.01); *B01D 2239/10* (2013.01)

(58) Field of Classification Search
CPC ............ B01D 67/0013; B01D 67/0093; B01D 2239/10
See application file for complete search history.

(56) References Cited

U.S. PATENT DOCUMENTS

| | | | |
|---|---|---|---|
| 2003/0121844 A1* | 7/2003 | Koo ................... | B01D 67/0088 210/490 |
| 2006/0117949 A1* | 6/2006 | Kulkarni .............. | B01D 53/228 95/45 |

(Continued)

FOREIGN PATENT DOCUMENTS

| | | | | |
|---|---|---|---|---|
| GB | 2 437 519 A | 10/2007 | | |
| GB | WO 2012010889 A1 * | 1/2012 | ......... | B01D 67/0088 |
| WO | 2012/010889 A1 | 1/2012 | | |

OTHER PUBLICATIONS

International Search Report and Written Opinion pertaining to Application No. PCT/BE2013/000047, 9 pages.

*Primary Examiner* — Dah-Wei D Yuan
*Assistant Examiner* — Kristen A Dagenais
(74) *Attorney, Agent, or Firm* — Dinsmore & Shohl LLP (57) ABSTRACT

The present invention relates to improved methods for the preparation of thin film composite membranes by interfacial polymerization, preferably (organic) solvent resistant thin film composite membranes. More in particular the method of the present invention allows for the preparation of thin film composite membranes wherein a thin film is deposited on a porous crosslinked support. Said method comprises the one step solidification, impregnation and crosslinking of the porous support through phase inversion by immersion of the cast membrane polymer film in an (aqueous) solvent comprising a polyfunctional monomers.

12 Claims, 2 Drawing Sheets

(56) References Cited

U.S. PATENT DOCUMENTS

| | | | | |
|---|---|---|---|---|
| 2010/0006495 A1* | 1/2010 | Buschmann | ....... | B01D 67/0006 210/500.25 |
| 2010/0038306 A1* | 2/2010 | Livingston | ........... | B01D 61/027 210/496 |
| 2012/0223014 A1* | 9/2012 | Boam | ................. | B01D 61/246 210/644 |

* cited by examiner

METHOD FOR SYNTHESIS OF THIN FILM COMPOSITE MEMBRANES

FIELD OF THE INVENTION

The present invention relates to an improved method for the preparation of thin film composite (TFC) membranes by interfacial polymerization. The method of the present invention particularly relates to an improved method for the preparation of TFC membranes, which are resistant to organic solvents.

BACKGROUND OF THE INVENTION

Membrane separation processes are an increasingly important field in the art of separation science. They can be applied in the separation of a range of components of varying molecular weights in gas or liquid phases, including but not limited to nanofiltration, desalination and water treatment (see e.g. Basic Principles of Membrane Technology, Second Edition, M. Mulder, Kluwer Academic Press, Dordrecht. 564 p).

Membrane separation processes are widely applied in the filtration of aqueous fluids (e.g. desalination and waste water treatment). However, membrane separations have not been widely applied for the separation of solutes in organic solvents, despite the fact that organic filtrations, such as organic solvent nanofiltration has many potential applications in industry. This is mainly due to the relatively poor performance and/or stability of the membrances in organic solvents.

Many membranes for aqueous applications (e.g. desalination membranes, nanofiltration membranes) are thin film composite (TFC) membranes, which can be made by interfacial polymerisation (IFP). In the interfacial polymerisation technique, an aqueous solution of a reactive monomer (often a polyamine (e.g. a diamine)) is first deposited in the pores of a microporous support membrane (e.g. a polysulfone ultrafiltration membrane)—this step is also referred to as support membrane impregnation. Then, the porous support membrane loaded with the monomer is immersed in a water-immiscible (organic) solvent solution containing a second reactive monomer (e.g. a tri- or diacid chloride). The two monomers react at the interface of the two immiscible solvents, until a thin film presents a diffusion barrier and the reaction is completed to form a highly cross-linked thin film layer that remains attached to the support membrane. Since membranes synthesized via this technique usually have a very thin top layer, high solvent permeancies are expected.

The thin film layer can be from several tens of nanometres to several micrometres thick. The IFP technique is well known to those skilled in the art [Petersen, R. J. "Composite reverse osmosis and nanofiltration membranes". J. Membr. Sci, 83, 81-150, 1993]. The thin film is selective between molecules, and this selective layer can be optimized for solute rejection and solvent flux by controlling the coating conditions and characteristics of the reactive monomers. The microporous support membrane can be selectively chosen for porosity, strength and solvent resistance.

A particularly preferred class of TFC membranes, well known in the art, are PA TFC membranes whereby polyamides are formed by interfacial polymerization on the surface of a porous support membrane.

U.S. Pat. No. 5,246,587 describes an aromatic polyimide RO membrane that is made by first coating a porous support material with an aqueous solution containing a polyamine reactant and an amine salt. Examples of suitable polyamine reactants provided include aromatic primary diamines (such as, m-phenylenediamine or p-phenylenediamine or substituted derivatives thereof, wherein the substituent is an alkyl group, an alkoxy group, a hydroxy alkyl group, a hydroxy group or a halogen atom; aromatic secondary diamines (such as, N,N-diphenylethylene diamine), cycloaliphatic primary diamines (such as cyclohexane diamine), cycloaliphatic secondary diamines (such as, piperazine or trimethylene dipiperidine); and xylene diamines (such as m-xylene diamine). The organic solution contains an amine-reactive polyfunctional acyl halide.

TFC membranes formed by IFP are often used for nanofiltration or reversed osmosis applications. Nanofiltration applications have gained attention based on the relatively low operating pressures, high fluxes and low operation and maintenance costs associated therewith. Nanofiltration is a membrane process utilising membranes of molecular weight cut-off in the range of 200-2,000 Daltons. Nanofiltration has been widely applied to filtration of aqueous fluids, but due to a lack of suitable solvent stable membranes, it has not been widely applied to the separation of solutes in organic solvents. This is despite the fact that organic solvent nanofiltration (OSN) has many potential applications in manufacturing industry including solvent exchange, catalyst recovery and recycling, purifications, and concentrations.

The support membranes generally used for commercial TFC membranes are often polysulfone or polyethersulfone ultrafiltration membranes. These supports have limited stability for organic solvents and, therefore, thin film composites membranes of the prior art which are fabricated with such supports cannot be effectively utilized for all organic solvent nanofiltration applications. WO2012010889 describes nanofiltration TFC composite membranes formed by IFP on a support membrane, made from e.g. crosslinked polyimide, wherein said support membrane is further impregnated with a conditioning agents and is stable in polar aprotic solvents. U.S. Pat. No. 5,173,191, suggests nylon, cellulose, polyester, Teflon and polypropylene as organic solvent resistant supports. U.S. Pat. No. 6,986,844 proposes the use of crosslinked polybenzimidazole for making suitable support membranes for TFC. However, there remains a need for solvent resistant membranes having good filtration properties (high permeancy & selectivity).

In the prior art, TFC membrane preparation by IFP comprises several steps: support membrane solidification (e.g. by phase inversion), support membrane saturation or impregnation by the amine monomer and the IFP reaction itself. In case of crosslinked PI support membranes (for use in e.g. solvent resistant applications) an additional crosslinking reaction step (with e.g. multifunctional amines) is required. These multiple steps make TFC membrane preparation by IFP a time-consuming (and hence uneconomic) process. There hence is a need in the art for improved TFC membrane preparation.

SUMMARY OF THE INVENTION

The present invention provides a new method for preparing TFC membranes by IFP. Advantageously, the method of the present invention allows for the preparation of TFC membranes comprising a crosslinked support providing increased resistance to (organic) solvents. The known methods to prepare such TFC membranes by IFP comprise first (i) the casting and solidification (by e.g. phase inversion) of the support membrane, (ii) the crosslinking of said support using polyfunctional monomers binding with the functional groups of the support polymer, (iii) impregnation of the support membrane with a first reactive monomer solution and (iv) finally treatment of the impregnated support membrane with a water-immiscible solvent solution containing a second reactive monomer, which interfacially polymerizes with said first reactive monomer.

In the new approach disclosed in this document, polyfunctional monomers, comprising at least two nucleophile functional groups are added in an earlier step of the membrane synthesis process, i.e. during membrane solidification, by introducing the multifunctional nucleophile monomers in the coagulation baths. In this way the crosslinking and impregnation of the support can be effectuated during the solidification of said support. In particular, the present invention provides a method for preparing a TFC membrane comprising a support, which comprises a cross-linked first polymer, and a top layer comprising a film of a second polymer, wherein said method comprises the steps of (I) casting a solution of said first polymer onto a suitable substrate;
(ii) immersing said casted first polymer solution into a coagulation medium to solidify the first polymer, wherein said coagulation medium comprises polyfunctional monomers, such that during coagulation of said first polymer part of said polyfunctional monomers provides for the cross-linking of said first polymer, while another part of said polyfunctional monomers provides for the impregnation of said first polymer with a solution of polyfunctional monomers;
(iii) contacting the solidified and impregnated support obtained in step (ii) with a solvent which is immiscible with said coagulation medium and comprises a polyfunctional monomer for interfacial polymerization, whereby said latter monomer interfacially polymerises with at least one of the polyfunctional monomers impregnated in the support to form a thin film layer.

In a preferred embodiment the present invention provides an interfacial polymerisation method for forming a solvent resistant TFC membrane formed by phase inversion via immersion precipitation, wherein said TFC membrane comprises a polyamide (PA) top layer and a crosslinked polyimide (PI) support membrane, comprising the steps of (a) preparing a porous support membrane by (i) casting a polyimide polymer film onto a supporting substrate and (ii) the one step membrane solidification, membrane crosslinking and membrane impregnation by immersing said cast polymer film in a coagulation medium comprising an aqueous solution of at least one amine, such as a di, tri or polyamine; (b) contacting the impregnated and solidified support membrane with a second reactive monomer solution comprising a water-immiscible solvent and an acyl chloride, including but not limited to mono- or polyacyl chloride, such as trimesoyl chloride. More particularly, said preferred embodiment of the present invention relates to a method for preparing a TFC membrane, which comprises a cross-linked polyimide support and a top layer comprising a polyamide film, wherein said method comprises the steps of (i) casting a polyimide solution onto a suitable substrate,
(ii) immersing said cast polyimide solution into an aqueous coagulation medium to solidify the polyimide, wherein said aqueous coagulation medium comprises polyfunctional amine monomers, such that during coagulation of the polyimide, part of said amine monomers provides for the cross-linking of said polyimide, while another part of said amine monomers provides for the impregnation of said polyimide with an aqueous solution of amine monomers,
(iii) contacting the solidified and impregnated polyimide support obtained in step (ii) with a water immiscible-solvent comprising polyfunctional acyl halide monomers, whereby said acyl halide monomers and said impregnated amine monomers interfacially polymerise to form a thin film polyamide layer.

DESCRIPTION

Legend of the Figures

DESCRIPTION

The inventors developed a simplified method to prepare TFC membranes. More in particular, the present invention provides a method for preparing crosslinked TFC membranes, which typically are resistant to organic solvents. The scope of the applicability of the present invention will become apparent from the detailed description and drawings provided below. However, it should be understood that the detailed description and specific examples, while indicating preferred embodiments of the present invention, are given by way of illustration only since various changes and modifications within the spirit and scope of the invention will become apparent to those skilled in the art from this detailed description. Unless otherwise defined, all technical and scientific terms used herein have the same meaning as commonly understood by one of ordinary skill in the art to which this invention belongs.

According to a broad aspect, the present invention encompasses a method for preparing a TFC membrane comprising a preferably porous support, which comprises a cross-linked first polymer, and a top layer comprising a film of a second polymer, wherein said method comprises the steps of (i) casting a solution of said first polymer onto a suitable substrate;
(ii) immersing said casted first polymer solution into a coagulation medium to solidify the first polymer, wherein said coagulation medium comprises polyfunctional monomers, such that during coagulation of said first polymer part of said polyfunctional monomers provides for the cross-linking of said first polymer, while another part of said polyfunctional monomers provides for the impregnation of said first polymer with a solution of polyfunctional monomers;
(iii) contacting the solidified and impregnated support obtained in step (ii) with a solvent, which is immiscible with said coagulation medium and comprises polyfunctional monomers for interfacial polymerization, whereby said latter monomer interfacially polymerises with at least one of the polyfunctional monomers impregnated in the support to form a thin film layer.

In case said first polymer is selected out of the group consisting of polyimides, polyepoxides, and polycarboxyls, said polyfunctional monomers of step (ii) preferably comprise polyfunctional amines, alcohols or thiols as monomers providing for said cross-linking of the first polymer.

In case said first polymer is a poly-isocyanate, said polyfunctional monomers of step (ii) preferably comprise a polyfunctional alcohol as monomer providing for said cross-linking of the first polymer.

In case said first polymer is a polyalkene, said polyfunctional monomers of step (ii) preferably comprise a polyfunctional thiol as monomer providing for said cross-linking of the first polymer.

In case said first polymer is a polyacrylonitrile, said polyfunctional monomers of step (ii) preferably comprise a polyfunctional amine, preferably thiosemicarbazide, urea or hydrazine, as monomer providing for said cross-linking of the first polymer.

In case said first polymer is a polybenzimidazole, said polyfunctional monomers of step (ii) preferably comprise a polyfunctional amine, thiol or divinylsulfone as monomer providing for said cross-linking of the first polymer.

According to a specific embodiment of this aspect of the invention, said polyfunctional monomers of step (ii) comprise polyfunctional amines, polyfunctional alcohols, polyfunctional thiols or any combination thereof. In a more specific embodiment of this aspect of the invention, said polyfunctional monomers comprise polyfunctional alcohols, including but not limited to (poly)ethylene glycol, 1-3propanediol, 1-4 butanediol, 1-6hexanediol, 2-2diethyl-1-6hexanediol, 1-8octanediol, 1-9nonanediol, 1-10decanediol, 1-12 dodecanediol, 1-4 cyclohexanediol, 1-4cyclohexanedimethanol, pxyleneglycol, poly(butadienepolyols), poly(tetramethyleneglycol) and the like. In another specific embodiment of this aspect of the invention, said polyfunctional monomers comprise polyfunctional thiols. In yet another more specific embodiment of this aspect of the invention, said polyfunctional monomers comprise polyfunctional amines.

According to a specific embodiment of this aspect of the invention, said polyfunctional monomers for interfacial polymerization of step (iii) are polyfunctional acyl halides, more specifically polyfunctional acylchlorides, such as trimesoyl chloride.

According to a more specific embodiment of this aspect of the invention, when said polyfunctional monomers of step (ii) comprise polyfunctional amines, said polyfunctional monomers for interfacial polymerization of step (iii) are preferably selected from polyfunctional acyl halides, more specifically polyfunctional acylchlorides, such as trimesoyl chloride; polyfunctional isocyanates; polyfunctional sulfonyl halides: polyfunctional haloformyloxy-substituted acyl halides, such as 5-bromoformyloxyisophthaloyl dibromide, 4-chloroformyloxyisophthaloyl chloride, 2-chloroformyloxyisophthaloyl chloride, 5-chloroformyloxyisophthaloyl chloride, 5-chloroformyl isophthaloylchloride (5CFIPC), 4-chloroformyl isophthaloylchloride, 3,5-dichloroformyl benzoylchloride and 1,3,5-phenyltrichloroformate (PTCF), cyclobutane; cyclopentane or cyclohexane chloroformates, and the heterocyclic triazine chloroformates; and polyfunctional isocyanate-substituted acyl halides such as isocyanate-substituted acyl chlorides, 5-isocyanatoisophthaloyl chloride, 3,5-diisocyanatobenzoyl chloride, 5-isocyanatocyclohexane-1,3-dicarbonyl chloride, 2,4-toluenediisocyanate, and the like.

According to another more specific embodiment of this aspect of the invention, when said polyfunctional monomers of step (ii) comprise polyfunctional alcohols, said polyfunctional monomers for interfacial polymerization of step (iii) are preferably selected from polyfunctional acyl halides, more specifically polyfunctional acylchlorides, such as trimesoyl chloride; and polyfunctional isocyanates such as toluene-, isophorone- and hexamethylenediisocyanates, 1,4-diisocyanatobenzene or 1,3,5-triisocyanatobenzene, tolyldiisocyanate, tolylene-2,4,6-triisocyanate, hexamethylene diisocyanate biuret, hexamethylene isocyanurate (polyisocyanates), and the like.

According to another more specific embodiment of this aspect of the invention, said polyfunctional monomers of step (ii) comprise any combinations of amines, alcohols and thiols, including the combination of amines and alcohols, the combination of amines and thiols, the combination of alcohols and thiols, together with the corresponding polyfunctional monomers for interfacial polymerization of step (iii) as depicted for example in Table 1.

TABLE 1

Possible reactants for interfacial polymerization according to the present invention.

| aqueous phase: polyfunctional monomer/ crosslinker | examples | organic phase: polyfunctional monomer for interfacial polymerization | examples | product (=thin film which is top layer) |
|---|---|---|---|---|
| amine | | acyl chloride | | polyamide |
| alcohol | | acyl chloride | | polyester |
| thiol | | acyl chloride | | polythioester |
| alcohol | (poly)ethylene glycol, 1-3propanediol, 1-4 butanediol, 1-6hexanediol, 2-2diethyl-1-6hexanediol, 1-8octanediol, 1-9nonanediol, 1-10decanediol, 1-12 dodecanediol, | isocyanate | toluene-, isophorone- and hexamethylenediisocyanates, 1,4-diisocyanatobenzene or 1,3,5-triisocyanatobenzene, tolyldiisocyanate, tolylene-2,4,6-triisocyanate, hexamethylene diisocyanate biuret, hexamethylene isocyanurate (polyisocyanates) | polyurethane |

TABLE 1-continued

Possible reactants for interfacial polymerization according to the present invention.

| aqueous phase: polyfunctional monomer/ crosslinker | examples | organic phase: polyfunctional monomer for interfacial polymerization | examples | product (=thin film which is top layer) |
|---|---|---|---|---|
| | 1-4 cyclohexanediol, 1-4cyclohexane dimethanol, pxyleneglycol, poly(butadienepolyols), poly(tetramethyleneglycol) | | | |
| amine | | isocyanate | | polyurea |
| amine | | sulfonyl halide | | polysulfonamide |
| amine | | haloformyloxy-substituted acyl halide | 5-bromoformyloxyisophthaloyl dibromide, 4-chloroformyloxyisophthaloyl chloride, 2-chloroformyloxyisophthaloyl chloride, and 5-chloroformyloxyisophthaloyl chloride 5-chloroformyl isophthaloylchloride (5CFIPC), 4-chloroformyl isophthaloylchloride, 3,5-dichloroformyl benzoylchloride and 1,3,5-phenyltrichloroformate (PTCF), cyclobutane, cyclopentane or cyclohexane chloroformates, and the heterocyclic triazine chloroformates | polyamide-urethane |
| amine | | isocyanate-substituted acyl chloride | 5-isocyanatoisophthaloyl chloride, 3,5-diisocyanatobenzoyl chloride, 5-isocyanatocyclohexane-1,3-dicarbonyl chloride, 2,4-toluenediisocyanate | polamide-urea |

Preferably, the method of the present invention involves an interfacial polymerisation process for forming a composite membrane, whereby the TFC top layer is a polyamide top layer and wherein said polyfunctional monomers of step (ii) comprise polyfunctional amines and said polyfunctional monomers for interfacial polymerization of step (iii) is a polyfunctional acyl halide, particularly an acyl chloride.

In a preferred embodiment, the present invention provides a method for obtaining TFC membranes with a polyamide top layer on a crosslinked polyimide support, comprising the one step synthesis, crosslinking and impregnation of the crosslinked PI support, preferably via a phase inversion process by immersion precipitation. Thus, this preferred method of the present invention relates to an interfacial polymerisation process for forming a composite membrane, whereby the TFC top layer is a polyamide top layer and wherein the support is a crosslinked PI membrane and wherein said method comprises the steps of: (a) preparing a porous support by (i) casting a polyimide polymer film onto a substrate and (ii) the one step solidification, crosslinking and impregnation by immersing said cast polyimide polymer film in a coagulation medium comprising an active compound, preferably an amine solution (comprising one or more amines, such as a di, tri or polyamine), preferably an aqueous amine solution; and (b) contacting the impregnated, crosslinked and solidified support with a second reactive monomer solution comprising a second solvent, preferably a water-immiscible solvent and a second reactive monomer, particularly an acyl chloride. More particularly, said preferred embodiment of the present invention relates to a method for preparing a TFC membrane, which comprises a—preferably porous—cross-linked polyimide support and a top layer comprising a polyamide film, wherein said method comprises the steps of (i) casting a polyimide solution onto a suitable substrate,
(ii) immersing said cast polyimide solution into an aqueous coagulation medium to solidify the polyimide, wherein said aqueous coagulation medium comprises polyfunctional amine monomers, such that during coagulation of the polyimide, part of said amine monomers provides for the cross-linking of said polyimide, while another part of said amine monomers provides for the impregnation of said polyimide with an aqueous solution of amine monomers,
(iii) contacting the solidified and impregnated polyimide support obtained in step (ii) with a water immiscible- solvent comprising polyfunctional acyl halide monomers, whereby said acyl halide monomers and said impregnated amine monomers interfacially polymerise to form a thin film polyamide layer.

Different polyimide polymer sources, that are presented in the prior art, can be used to prepare the crosslinked polyimide (PI) support. These include U.S. Pat. Nos. 4,981,497; 4,931,182; 6,660,062; 5,246,166; 6,180,008; 4,307,135; 3,708,458; 3,789,079; 3,546,175; 3,179,632; 3,179,633; 3,925,211; 4,113,628; 3,816,303; 4,240,914; 3,822,202; 3,853,754; 1,434,629. Preferred PI sources are the commercially available Matrimid® 5218 (Huntsman Corporation, Germany), a commercially available polyetherimide (Sigma Aldrich) and Lenzing P84 polyimide.

Matrimid® (CAS 62929-02-6) is a class of commercial polyimide materials with Matrimid 5218 consisting of 3,3', 4,4'-benzophenone tetracarboxylic dianhydride and diaminophenylindane monomers, while Matrimid 5292A is built up from 4,4 Bismaleimidodiphenylmethane).

Polyetherimide, available at Sigma Aldrich (700193, CAS 61128-46-9) is also known as poly(bisphenol A anhydride-co-1,3-phenylenediamine), Poly(bisphenol A-co-4-nitrophthalic anhydride-co-1,3-phenylenediamine) or Poly-[2, 2'bis(4-(3,4-dicarboxyphenoxyl)phenylpropane)-1,3-phenylene bisimide].

The polymer Lenzing P84 is available from HP polymers Gmbh, Austria. This polyimide is a copolymer derived from the co-condensation of benzophenone 3,3',4,4'-tetracarboxylic acid dianhydride (BTDA) and a mixture of di(4-aminophenyl) methane and toluene diamine or the corresponding diisocyanates, 4,4'-methylenebis(phenyl isocyanate) and toluene diisocyanate. The resulting copolyimide has imide linkages that can be represented by two structural formulas I and II. The copolymer comprises 10-90% (preferably 20%) of structure I and 90-10% (preferably 80%) of structure II.

I

II

In the context of said preferred embodiment of the present invention, the coagulation medium comprises at least one type of polyfunctional monomers. Preferably, said polyfunctional monomers are di, tri or polyamines. Said coagulation medium may comprise a single type of polyfunctional monomers providing for both the crosslinking of the polyimide and the interfacial polymerisation (IFP). Alternatively, the coagulation medium comprises multiple types of polyfunctional polymers, whereby the types of monomers primarily acting as IFP monomer may be different from types of monomers primarily acting as crosslinking agent. For instance, hexane diamine (HDA) may be more involved in the crosslinking, while m-phenylene diamine (MPD) may more preferentially provide for IFP.

In the context of this preferred embodiment of the present invention, polyfunctional monomers providing for crosslinking the polyimide may be multifunctional amines, alcohols, thiols or other chemical compounds containing at least two nucleophile functional groups. Amines will generally react faster with the imide functionalities than thiols or alcohols. The reaction of an imide group with an amine will result in an amide bond, the reaction with an alcohol or thiol will result respectively in an ester or thioester bond. As a consequence, a polyimide crosslinked by multifunctional alcohols or thiols will be unstable if the membrane is contacted with alcoholic solvents. It should however remain stable in contact with aliphatics, aromatics, ketones and aldehydes. Suitable alcoholic crosslinking agents are ethylene glycol, propylene glycol, 1,3-propanediol, 1,4-butanediol, 1,2-butanediol, 1,3-butanediol, pentanediol, hexanediol, heptanediol, octanediol, nonanediol, decanediol, glycerol, glucose, and the like. These should not be taken as a limitation. Virtually all multifunctional alcohol compositions are suitable.

Suitable amino-crosslinkers are primary and/or secondary di-, tri- or polyamines. More specifically, suitable compounds are hydrazine, aliphatic amines, aliphatic-aromatic amines and aromatic amines. Aliphatic amines are preferably but not restrictedly selected from the group consisting of 1,2-diaminoethane, 1,3-diaminopropane, diaminobutane, diaminopentane, diaminohexane, diaminoheptane, diaminooctane, diaminononane, diaminodecane, methylamine, ethylamine, propylamine, isopropylamine, butylamine, isobutylamine, pentaamine, cyclohexylamine, dimethylamine, diethylamine, dipropylamine, diisopropylamine, ethylene diamine, N,N'-dimethylethylene diamine, N,N'-diethylethylenediamine, diethylenetriamine, triethylenetetraamine, tetraethylene pentaamine, pentaethylenehexamine, tris(2-aminoethyl)amine, 3-aminopropylmethyldiethoxysilane, 3-aminopropyldimethylethoxysilane, 3-aminopropyldiethoxysilane, N-methylaminopropyl-trimethoxysilane, 3-aminopropyltriethoxysilane, N-methylaminopropyltrimethoxysilane, 3-aminopropyl terminated polydimethylsiloxanes, polyethyleneimine, polyallylamine, polyvinylamine, polyether diamines based predominantly on a polyethylene oxide backbone with a molecular weight of 50 to 20,000, trimethoxysilylpropyl-substituted polyethyleneamine having a molecular weight of 200 to 200,000, polyethyleneamine having a molecular weight of 1,000 to 200,000, aqueous ammonium hydroxide, and the like. Examples of aliphatic aromatic amines are benzylamine, m-xylylendiamine, p-xylylenediamine, and the like. The group of aromatic amines includes aniline, aniline derivatives, phenylene diamines, methylene dianiline, oxydianiline and the like. These should not be taken as a limitation. Virtually all multifunctional primary and secondary amino compositions are suitable.

In the particular case of the formation of PA-crosslinked PI TFC membranes by IFP, the rate of reaction between an amino-reagent and the imide-containing polymer and/or between the amine and the acyl chloride (in the interfacial PA formation) will vary greatly dependent on their chemical identity and the process conditions.

When crosslinking occurs in the coagulation medium a very fast reaction is preferred as well as a good diffusion of the crosslinker into the solidifying membrane matrix. The more reactive polyimides, Matrimid® and Lenzing P84 polyimide, are preferred in this method. In the case of amines, the most nucleophile amines that still have a good diffusion rate into the polymer are preferred. The choice is further restricted by the solubility of the amine compound in the solvent that is used as the coagulation medium (preferably water). Preferred amine crosslinking agents are water soluble. Any solvent solubilising the named amine compounds, not dissolving the uncrosslinked polymer, still allowing the phase inversion as well as the crosslinking reaction to take place can alternatively be used as solvent in the coagulation medium. For economic and upscaling purposes, the amine that has the highest reactivity at its lowest concentration in the coagulation bath is the preferred amine.

Good monomers for polyamide formation include amines that only slowly react with the polyimide polymer. Aliphatic amines with shorter chain lengths are less nucleophile and thus react slowly. Amines with longer or branched chains or aromatic amines may also be suitable as they are bulkier and steric hindrance may slow down the reaction. Polyetherimide is preferred as polymer, as it is less reactive than Matrimid® and Lenzing P84 polyimide since the ketone function is replaced by ether functions, decreasing the electrophilicity of the imide-C. The choice of the amine compound is further restricted by its solubility in the solvent system chosen to prepare the polymer casting solution. It may further be necessary to apply certain additives to the polymer casting solution to decrease or increase the reaction rate.

Typically, a membrane obtained according to any method of the present invention is further treated with wash baths and/or conditioning baths. Such post treatment step includes contacting the composite membranes prior to use for (nano) filtration with an activating solvent, including, but not limited to, polar aprotic solvents. In particular, activating solvents include DMAc, NMP, DMF and DMSO. The activating solvent in this art is defined as a liquid that enhances the composite membrane flux after treatment. The choice of activating solvent depends on the top layer and membrane support stability. Contacting may be effected through any practical means, including passing the composite membrane through a bath of the activating solvent, or filtering the activating solvent through the composite membrane. The second conditioning agent optionally applied may be impregnated into the membrane by immersing the TFC membrane in a water or organic solvent bath or baths comprising the second conditioning agent.

Support Preparation

In the context of the present invention the preparation of the support typically involves the following steps: (a) Preparing a polymer casting solution comprising (i) a polymer, and (ii) preferably a water immiscible solvent system for dissolving said polymer; (b) Casting a film of said casting solution onto a supporting substrate, optionally followed by an evaporation step; (c) Immersing the film cast on the substrate info a preferably aqueous coagulation medium containing polyfunctional reactive monomers, so that during coagulation of said polymer film, part of said polyfunctional monomers provides for the cross-linking of said polymer.

The polymer casting solution may be prepared by dissolving the polymer making up the membrane in one or a mixture of organic solvents, including the following water-miscible solvents: N-methylpyrrolidone (NMP), tetrahydrofuran (THF), N,N-dimethylformamide (DMF), N,N-dimethylacetamide (DMA), dimethylsulfoxide (DMSO), 1,4-dioxane, gamme-butyrolactone, water, alcohols, ketones and formamide. The weight percent of the polymer in solution may range from 5% to 30% in the broadest sense, although a 12% to 28% range is preferable and an 12% to 24% range or 14% to 20% is even more preferred.

Optionally, the polymer casting solution may also comprise polyfunctional monomers corresponding to those polyfunctional monomers of step (ii) or a selection thereof.

The polymer casting solution may further optionally comprise one or more of the following to give a viscous, polymer casting solution:

viscosity enhancers, preferably present in amounts less than 5% by weight of said casting solution, void suppressors, preferably present in amounts less than 10% by weight of said casting solution, surfactants, preferably present in amounts less than 5% by weight of said casting solution and/or discrete particles of an immiscible matrix, preferably present in amounts less than 20% by weight of said casting solution.

Additives such as viscosity enhancers may be present in amounts up to 10% by weight of the said polymer casting solution and these include polyvinyl pyrrolidones, polyethylene glycols and urethanes. Additionally additives such as void suppressors may be used in amounts up to 5% of the weight of said polymer casting solution, and in this case maleic acid produces the desired results. Additives such as surfactants, which influence the pore structure, may be used in amounts up to 5% of the weight of said polymer casting solution, for example Triton X-100 (available from Sigma-Aldrich UK Ltd. (octylphenoxy-polyethoxyethanol)).

Organic or inorganic matrices in the form of powdered solids may be present at amounts up to 20 wt % of the said polymer casting solution. Carbon molecular sieve matrices can be prepared by pyrolysis of any suitable material as described in U.S. Pat. No. 6,585,802.

Zeolites as described in U.S. Pat. No. 6,755,900 may also be used as an inorganic matrix. Metal oxides, such as titanium dioxide, zinc oxide and silicon dioxide may be used, for example the materials available from Degussa AG (Germany) under their Aerosol and AdNano trademarks. Mixed metal oxides such as mixtures of cerium, zirconium, and magnesium may be used. Preferred matrices will be particles less than 1.0 micron in diameter, preferably less than 0.1 microns in diameter, and preferably less than 0.01 microns in diameter. In some cases it may be advantageous to disperse the matrices in a separate solution from the casting solution, preferably an organic solvent solution, and then subsequently add this solution to the casting solution containing the polymer. In a preferred embodiment crystals or nanoparticles of an inorganic matrix, for example zeolites or metal oxides, may be grown to a selected size in a separate solution from the casting solution, and this dispersion solution subsequently added to the casting solution containing the polymer. This separate solution may comprise water or an organic solvent with nanoparticles dispersed in the continuous liquid phase. In yet a further preferred embodiment, the solvent in which the matrix is dispersed may be volatile, and it may be removed from the casting solution prior to membrane casting by evaporation.

Once the polymer is dissolved in a suitable solvent system as described, and optionally organic or inorganic matrices are added into the casting solution so that the matrices are well dispersed, it is cast onto a suitable, preferably porous substrate. The substrate can take the form of an inert porous material which does not hinder the passage of permeate through the membrane and does not react with the membrane material, the casting solution, the gelation bath solvent, or the solvents which the membrane will be permeating in use. Typical examples of such inert substrate are metal mesh, sintered metal, porous ceramic, sintered glass, paper, porous non-dissolved plastic, and woven or non-woven material. Preferably, the support material is a non-woven polymeric material, such as a polyester, polyethylene, polypropylene, polyetherether ketone (PEEK), polyphenyline sulphide (PPS), Ethylene-(R) ChloroTriFluoroEthylene (Halar ECTFE), or carbon fibre material.

Following the casting operation, a portion of the solvent may be evaporated under conditions sufficient to produce a dense, ultra-thin, top "skin" layer on the support. Typical evaporation conditions adequate for this purpose include exposure to air for a duration of less than 100 seconds, preferably less than 30 seconds. In yet a further preferred embodiment, air is blown over the membrane surface at 15° C. to 25° C. for a duration of less than 30 seconds.

In this text, the term "phase inversion" refers to the controlled transformation of a thermodynamically stable membrane solution to a solid phase by liquid-liquid-demixing. It can be carried out by immersion of the cast membrane in a bath containing a non-solvent for the polymer, possibly following a solvent evaporation step during which a certain phase inversion can take place already or not (immersion precipitation); or by contacting the cast membrane with a vapour phase containing a non-solvent for the polymer or by thermal precipitation. These processes will be known to one skilled in the art. In the context of the present invention, phase inversion by immersion precipitation is preferred.

The term "halo" means any atom selected from the group consisting of fluorine (F), chlorine (CI), bromine (Br) and iodine (I). Accordingly the term "halide" means any atom selected from the group consisting of fluoride, chloride, bromide and iodide.

Interfacial Polymerisation

The interfacial polymerization reaction is generally held to take place at the interface between a first reactive polyfunctional monomer solution, and a second reactive polyfunctional monomer solution, which form two phases. Each phase may include a solution of a single type of dissolved polyfunctional monomers or a combination of different types of polyfunctional monomers. Concentrations of the dissolved monomers may vary. Variables in the system may include, but are not limited to, the nature of the solvents, the nature of the monomers, monomer concentrations, use of additives in any of the phases, reaction temperature and reaction time. Such variables may be controlled to define the properties of the membrane, e.g., membrane selectivity, flux, top layer thickness. Monomers used in the reactive monomer solutions may include, but are not limited to, diamines and diacyl halides. The resulting reaction may form a polyamide selective layer on top of the support membrane.

In this invention, the polymer matrix of the top layer can comprise any three-dimensional polymer network known to those of skill in the art. In one aspect, the thin film comprises at least one of an aliphatic or aromatic polyamide, aromatic polyhydrazide, polybenzimidazolone, polyepiamine/amide, polyepiamine/urea, poly-ethyleneimine/urea, sulfonated polyfurane, polybenzimidazole, polypiperazine isophtalamide, a polyether, a polyether-urea, a polyester, or a polyimide or a copolymer thereof or a mixture thereof. Typically, the polymer selected to form the thin film can be formed by an interfacial polymerization reaction. Many different types of polymers may be interfacially synthesized using interfacial polymerization. Polymers typically used in interfacial polymerization applications include, but are not limited to, polyamides, polyurea, polypyrrolidines, polyesters, polyurethanes, polysiloxanes, poly(amide imide), poly (ether amide), poly(urea amide) (PUA) [Petersen, R. J. "Composite reverse osmosis and nanofiltration membranes". J. Membr. Sci, 83, 81-150, 1993]. Preferably, polyamides are formed by IFP.

In a particular embodiment of this invention, the film comprises a polyamide. The polyamide can be an aromatic polyamide or a non-aromatic polyamide. For example, the polyamide can comprise residues of a phthaloyl (e.g. terephthaloyl or isophthaloyl) halide, a trimesyl halide, or a mixture thereof. In another example, the polyamide can comprise residues of diaminobenzene, triaminobenzene, piperazine, poly-piperazine, polyetherimine or a mixture thereof. In a further embodiment, the film comprises residues of a trimesoyl halide and residues of a diaminobenzene. In a further embodiment, the film comprises residues of trimesoyl chloride and m-phenylenediamine. In a further aspect, the film comprises the reaction product of trimesoyl chloride and m-phenylenediamine. Examples of suitable polyamine reactants provided include aromatic primary diamines (such as, m-phenylenediamine or p-phenylenediamine or substituted derivatives thereof, wherein the substituent is an alkyl group, an alkoxy group, a hydroxy alkyl group, a hydroxy group or a halogen atom; aromatic secondary diamines (such as, N,N-diphenylethylene diamine), cycloaliphatic primary diamines (such as cyclohexane diamine), cycloaliphatic secondary diamines (such as, piperazine or trimethylene dipiperidine); and xylene diamines (such as m-xylene diamine).

Aqueous monomer solutions may include, but are not limited to, an aqueous solution containing 1,6 hexenediamine, poly(ethyleneimine), an alternative aqueous monomer solution, and/or combinations thereof. Concentrations of solutions used in the interfacial polymerzation may be in a range from about 0.01 weight % to about 30 weight %.

Preferably, concentrations of the interfacial polymerization solutions may be in a range from about 0.1% weight % to about 5 weight %.

The second reactive monomer solution may contain di- or triacyl chlorides such as trimesoyl chloride or other monomers, dissolved in a nonpolar solvent such as hexane, heptane, toluene or xylene. Further, the second reactive monomer solution may include, but is not limited to, a xylene solution of iso-phthaloyl dichloride, sebacoyl chloride, an alternative organic monomer solution, and/or combinations thereof.

Solvent Resistance of TFC Membranes of the Present Invention

It is preferred that the TFC membranes prepared according to the method of the present invention have an increased resistance to organic solvents as a result of the crosslinking of the support polymer. In particular, the TFC membranes with a crosslinked polyimide support and a top layer comprising a polyamide film are typically characterised by a high resistance to organic solvents. The organic solvent resistant TFC membranes prepared using the methods of the invention can be used for filtration operations in organic solvents. In particular, they can be used for (nano)filtration operations in polar aprotic solvents. This is advantageous with respect to many of the prior art thin film composite nanofiltration membranes, which lose structure and dissolve in polar aprotic solvents such as dimethylacetimide (DMAc), dimethylformamide (DMF), dimethylsufoxide (DMSO), tetrahydrofuran (THF), N-methyl-2-pyrrolidone (NMP), and dichloromethane (DCM).

EXAMPLES

Abbreviations used:

PA (polyamide); PSf (polysulfon); NMP (N-methyl-2-pyrollidone); THF (tetrahydrofuran); MPD (m-phenylene diamine); EDA (ethane diamine); PDA (propane diamine); BDA (butane diamine); HDA (hexane diamine); ODA (octane diamine); SDS (Sodium dodecyl sulphate); polyamine (tris(2-amino ethyl)amine), TEA (triethylamine); TMC (Trimesoylchloride), SIM method (method according to the present invention wherein the solidification and impregnation of the support occurs during the solidification of the support)

The filtration performance (evaluated by the permeance and rejection properties of the membranes) is assessed by "dead-end" NF with the following feed solutions: 1000 ppm $MgSO_4$ in milliQ water; or a 35 µM Rose Bengal solution (RB in H2O, MeOH, EtOH or IPA). The salt concentration in feed and permeate is determined by conductivity measurement, while the RB concentration in feed and permeate is quantified by UV-VIS.

Example 1

Thin Film Composite Membranes—PA Layer on PI-Support (Solvent resistant) TFC membranes comprising a PA layer on a (cross-linked) polyimide support were prepared as follows:

A polymer dope solution was prepared by dissolving 12 wt %, 14 wt %, 16 wt % or 18 wt % polyimide (Matrimid® 9725 US (Huntsman)) in N-methyl-2-pyrrolidone/tetrahydrofuran (NMP/THF ratio of 3/1) until complete dissolution. The viscous polymer solution was allowed to stand for several hours to remove air bubbles. The dope solution was then cast onto a porous non-woven PP/PE supporting substrate (Novatexx 2471, Freudenberg). After a short evaporation step (0, 10, 20, 30; 60 s) (wherein the cast film is exposed to air and some of the volatile THF is removed from the top layer) the cast film is immersed (for 30 min) in a coagulation solution whereby phase inversion occurs.

In the SIM method, coagulation, crosslinking & membrane saturation occurs in a single step. The casted film is immersed in an aqueous amine solution of typically 2 wt %. The following amines were tested: MPD (m-phenylene diamine); EDA (ethane diamine); PDA (propane diamine); BOA (butane diamine); HDA (hexane diamine); ODA (octane diamine); SDS (Sodium dodecyl sulphate); polyamine (tris(2-amino ethyl)amine), TEA (triethylamine).

After phase inversion, crosslinking and saturation with the amine(s), TFC PA membranes were made on the PI support membrane through interfacial polymerisation.

The crosslinked PI support membrane is fixed on an inox plate and excess amine solution is removed. A glass frame is clamped (leakproof) on the PI support membrane and a solution of 0.1 wt % TMC in hexane is poured on the PSf support membrane. After 1 min of reaction, the TMC solution is removed & the membrane is rinced in hexane. The resulting TFC membrane is stored in water until used.

The polyimide crosslinking properties of MPD were poor (low stability of the MPD 'cross-linked' PI support membranes). The non-crosslinked PA-PI TFC membrane (with MPD as monomer) showed good filtration properties in water, but was not solvent-resistant. MPD is hence an amine suitable for the formation of a PA top layer, also with a PI support membrane.

Figure 1:
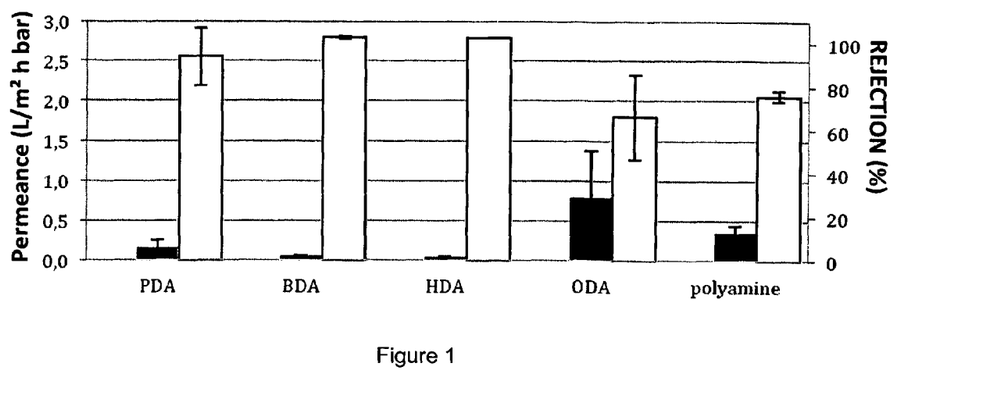
FIG. 1 shows the H20 permeance (black) and $MgSO_4$ rejection (white) of PA-PI TFC membranes, prepared with the SIM method and different crosslinkers in water.

PA-PI TFC membranes were further also prepared with different amines & their filtration properties (using 1000 ppm $MgSO_4$ in water as feed) were analysed (FIG. 1). This way, the crosslinking properties and the efficiency in IFP of the different amines could be evaluated.

Literature (Vanherck, Cano-Odena, Koeckelberghs, Dedroog, Vankelecom (2010) J Membr Sci, vol. 353, pp. 135-143) showed that for the synthesis of SRNF PI membranes XDA in MeOH a highly efficient crosslinking agent is. The solubility of XDA in water is however too low to be able to perform an efficient crosslinking reaction in the aqueous coagulation solution.

The use of HDA and BDA in the coagulation medium (as crosslinker & monomer in IFP) resulted in TFC membranes with the best rejection properties (FIG. 1). PDA, ODA, polyamine were found to be less suitable to be used in a TFC SIM synthesis method. In general, permeances were low. Without being bound by theory the different amines behave differently as crosslinker and as monomer in the IFP, resulting in (subtle) differences in the (molecular) membrane structure, particularly of the PA top layer, and hence different filtration performance. Similar results were obtained when the filtration characteristics of these membranes were tested with a RB/EtOH feed solution (not shown).

However, these results demonstrate that a PA-crosslinked PI SRNF TFC membrane can be formed by immersing the cast film in a (single) amine containing coagulation bath, thus performing the solidification of the PI membrane, the crosslinking of the PI membrane and saturation of the PI membrane with the amine (acting as monomer in the subsequent IFP) in one step.

Example 2

PA-PI TFC Membranes—MPD/HDA as Coagulation Medium

PA-(crosslinked)PI TFC membranes were prepared as in example 2 according to the SIM method. The casted film is immersed in an aqueous amine solution consisting of MPD (2 wt %) & HDA (0.1-1.0 wt %) solution (for 30 min). Stability measurements of the formed membranes showed that with 0.5 wt % HDA in the aqueous coagulation medium the crosslinked membranes showed 98% stability in DMF. Higher HDA percentages did not further increase membrane stability in DMF.

Filtration characteristics were analysed using a PA-PI TFC membrane prepared according to the SIM method (example 2), using an aqueous MPD (2 wt %)/HDA (0.5 wt %) solution as phase inversion medium.

Comparison of the filtration characteristics of the support membrane prepared by the SIM methode (example 2) with 2 wt % HDA or 2 wt % MPD+0.5 wt % HDA showed that RB rejection was similar for both membranes, but the EtOH permeance was lower for the MPD/HDA PI support membrane.

Figure 2:
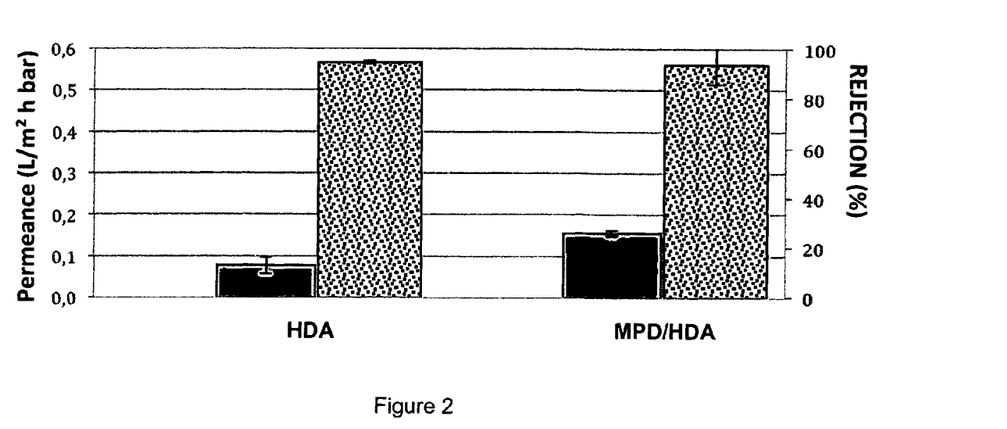
FIG. 2 shows the EtOH permeance (gray) and RB rejection (dots) of PA-PI TFC membranes, prepared with the SIM method and using an aqueous HDA or HDA/MPD coagulation medium.

The filtration performance of the PA-PI TFC membranes (with either a HDA or HDA/MPD coagulation medium) in EtOH is shown in FIG. 2. RB rejection was similar, while the EtOH permeance was increased for the membrane prepared using a HDA/MPD coagulation medium.

Example 3

Post-Preparation Treatment of TFC Membranes

The membranes prepared in example 3 showed good rejection properties but rather low permeances. Several post-preparation treatments were investigated for their impact on the permeance properties. PA-PI TFC membranes prepared as described in example 3 were (after storage in water) equilibrated with DMF (dimethylformamide); THF; NMP; hexane; or methanol, prior to the filtration experiments (RB in EtOH)

A 12 h DMF pre-equilibration resulted in an about 8-fold increase in EtOH permeance, while RB rejection remained high (<95%), compared to the membrane stored in water. A 24 h DMF pre-equilibration resulted in an about 30 fold increase in EtOH permeance, while RB rejection was not much affected. Similar observation (increasing permeances & no or increasing rejection upon DMF treatment) were made with MeOH and IPA as feed solutions.

Figure 3:
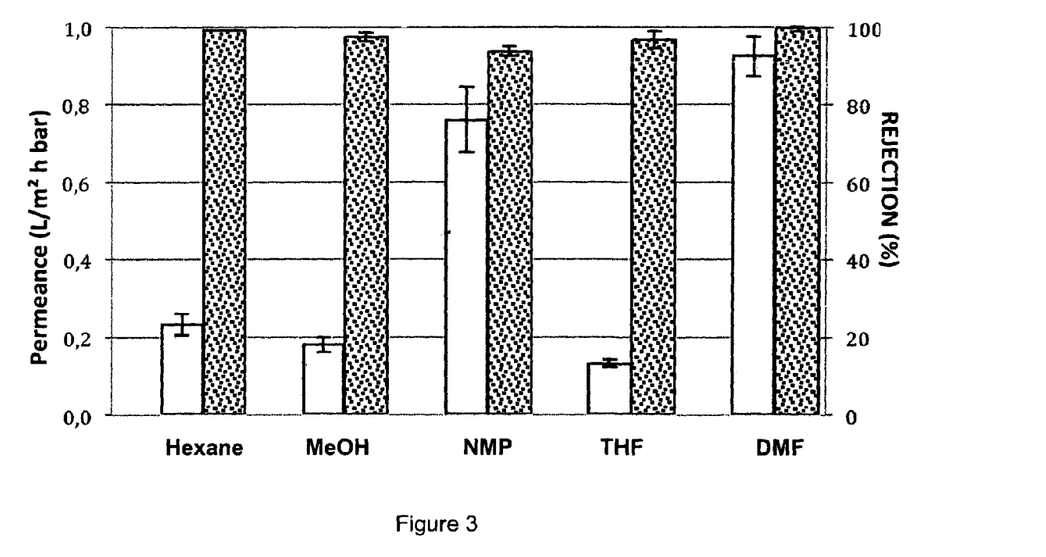
FIG. 3 shows the EtOH permeance (gray) and RB rejetion (dots) of PA-PI TFC membranes, prepared with the SIM method and using an aqueous HDA/MPD coagulation medium and with a pre-equilibration step in different solvents prior to filtration.

A 12 h pre-equilibration of the PA-PI TFC membranes (MPD/HDA) in different solvents (FIG. 3) also resulted in higher permeances than the membrane stored in water. The best results were obtained by NMP and DMF treatment.

The invention claimed is:

1. A method for preparing a thin film composite (TFC) membrane comprising a support, which comprises a cross-linked first polymer, and a top layer comprising a film of a second polymer, wherein said method comprises:
    (i) casting a solution of said first polymer onto a suitable substrate;
    (ii) preparing a solidified and impregnated support by immersing said cast first polymer solution into an aqueous coagulation medium comprises first polyfunctional monomers, such that during coagulation of said first polymer, part of said first polyfunctional monomers cross-links said first polymer, while another part of said first polyfunctional monomers are comprised in an aqueous solution that impregnates the solidified first polymer; and
    (iii) contacting the solidified and impregnated support of (ii) with a water-immiscible solvent comprising second polyfunctional monomers, whereby said second polyfunctional monomers interfacially polyermise with at least one of the impregnated polyfunctional monomers of (ii) to form a thin film second polymer layer.

2. The method according to claim 1, wherein said TFC membrane comprises a cross-linked polyimide, and a top layer comprising a polyamide film, wherein said method comprises:
    (i) casting a polyimide solution onto a suitable substrate;
    (ii) preparing a solidified and impregnated support by immersing said casted polyimide solution into an aqueous coagulation medium to solidify the polyimide, wherein said aqueous coagulation solution comprises polyfunctional amine monomers, such that during coagulation of said polyimide, part of said polyfunctional amine monomers cross-links said polyimide, while another part of said polyfunctional amine monomers are comprised in an aqueous solution that impregnates said solidified polyimide; and
    (iii) contacting said solidified and impregnated polyimide support of (ii) with a water immiscible-solvent comprising polyfunctional acyl halide monomers, whereby said acyl halide monomers and said impregnated polyfunctional amine monomers of (ii) interfacially polymerise to form a thin film polyamide layer.

3. The method according to claim 2 wherein said polyfunctional acyl halide monomers comprise an acylchloride.

4. The method according to claim 2 wherein said polyimide is present in 6-35 weight percent of the casting solution in (i).

5. The method according to claim 2 wherein said polyimide is a polymer with the following structure:

6. The method according to claim 2 wherein said polyimide is a polymer with the following structure:

7. The method according to claim 2 wherein said polyfunctional amine monomers comprise an amine having at least two functional groups in its chemical structure, said functional groups are selected from primary amines or secondary amines.

8. The method according to claim 7 wherein said amine is a primary and/or secondary di-, tri- or polyamine.

9. The method according to claim 8 wherein said amine is at least one compound selected from: 1,2-diaminoethane, 1,3-diaminopropane, diaminobutane, diaminopentane, diaminohexane, diaminoheptane, diamino-octane, diaminononane, diaminodecane, ethylene diamine, N,N'-dimethylethylene diamine, N,N'-diethylethylenediamine, diethylenetriamine, triethylenetetraamine, tetraethylene pentaamine, pentaethylenehexamine, tris(2-aminoethyl)amine, polyethyleneimine, polyallylamine, polyvinylamine, polyether diamines based predominantly on a polyethylene oxide backbone with a molecular weight of 50 to 20,000, trimethoxysilylpropyl-substituted polyethyleneamine having a molecular weight of 200 to 200,000, polyethyleneamine having a molecular weight of 1,000 to 200,000, m-xylylendiamine, p-xylylenediamine, multifunctional aniline derivatives, phenylene diamines, methylene dianiline, and oxydianiline.

10. The method according to claim 2 wherein said polyimide casting solution of (i) comprises any or a mixture of organic solvents selected from N-methylpyrrolidone, etrahydrofuran, N,N-dimethylformamide, N,N-dimethylacetamide, dimethylsulfoxide, 1,4-dioxane, gamma-butyrolactone, water, alcohols, ketones or formamide.

11. The method of claim 1, wherein the first polymer is a polyimide and wherein the aqueous coagulation medium comprises polyfunctional amine monomers.

12. The method of claim 11, wherein the second polyfunctional monomers for interfacial polymerization of (iii) are selected from the group consisting of acyl halides, isocyanates, sulfonyl halides, haloformyloxy-substituted acyl halids, and isocyanate-substituted acyl halides.

* * * * *

UNITED STATES PATENT AND TRADEMARK OFFICE
CERTIFICATE OF CORRECTION

PATENT NO. : 9,808,768 B2
APPLICATION NO. : 14/430697
DATED : November 7, 2017
INVENTOR(S) : Ivo Vankelecom et al.

Page 1 of 1

It is certified that error appears in the above-identified patent and that said Letters Patent is hereby corrected as shown below:

Column 20, Line 5, Claim 5:
"organic solvents selected from N-methylpyrrolidone, etra-"
Should read:
--organic solvents selected from N-methylpyrrolidone, tetra- --.

Signed and Sealed this
Eleventh Day of December, 2018

Andrei Iancu
*Director of the United States Patent and Trademark Office*